(12) United States Patent
Moser et al.

(10) Patent No.: US 9,670,967 B2
(45) Date of Patent: Jun. 6, 2017

(54) CLUTCH DEVICE FOR A DRIVE TRAIN

(71) Applicant: BorgWarner Inc., Auburn Hills, MI (US)

(72) Inventors: Alexander Moser, Ketsch (DE); Florian Schneider, Heilbad Heiligenstadt (DE)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 14/388,939

(22) PCT Filed: Mar. 22, 2013

(86) PCT No.: PCT/US2013/033420
§ 371 (c)(1),
(2) Date: Sep. 29, 2014

(87) PCT Pub. No.: WO2013/151800
PCT Pub. Date: Oct. 10, 2013

(65) Prior Publication Data
US 2015/0083546 A1    Mar. 26, 2015

(30) Foreign Application Priority Data
Apr. 2, 2012   (DE) .................. 10 2012 006 730

(51) Int. Cl.
*F16D 25/10*     (2006.01)
*B60K 6/383*    (2007.10)
(Continued)

(52) U.S. Cl.
CPC .............. *F16D 13/52* (2013.01); *B60K 6/383* (2013.01); *B60K 6/48* (2013.01); *F16D 23/14* (2013.01);
(Continued)

(58) Field of Classification Search
CPC ....................................................... F16D 41/04
See application file for complete search history.

(56) References Cited

U.S. PATENT DOCUMENTS

| 4,114,746 A | 9/1978 | Usui et al. |
| 4,854,192 A | 8/1989 | Churchill et al. |

(Continued)

FOREIGN PATENT DOCUMENTS

| JP | 2011503452 A | 1/2011 |
| WO | 2008068122 A | 6/2008 |

OTHER PUBLICATIONS

International Search Report and Written Opinion; date of mailing Jul. 23, 2013 ; for International Application No. PCT/US2013/033420; 9 pages.

*Primary Examiner* — Ramya Burgess
*Assistant Examiner* — Lillian Nguyen
(74) *Attorney, Agent, or Firm* — BrooksGroup

(57) ABSTRACT

A clutch device for arrangement in a drive train of a motor vehicle between a drive unit and a gearbox, which comprises a clutch for optional torque transmission between the drive unit and the gearbox, a clutch input side to which a torque from the drive unit can be transmitted, and an electric machine allocated to the clutch input side, wherein an overrun to transmit the torque from the drive unit in only one rotational direction is arranged upstream of the clutch input side in relation to the torque transmission path.

15 Claims, 5 Drawing Sheets

Figure 1:
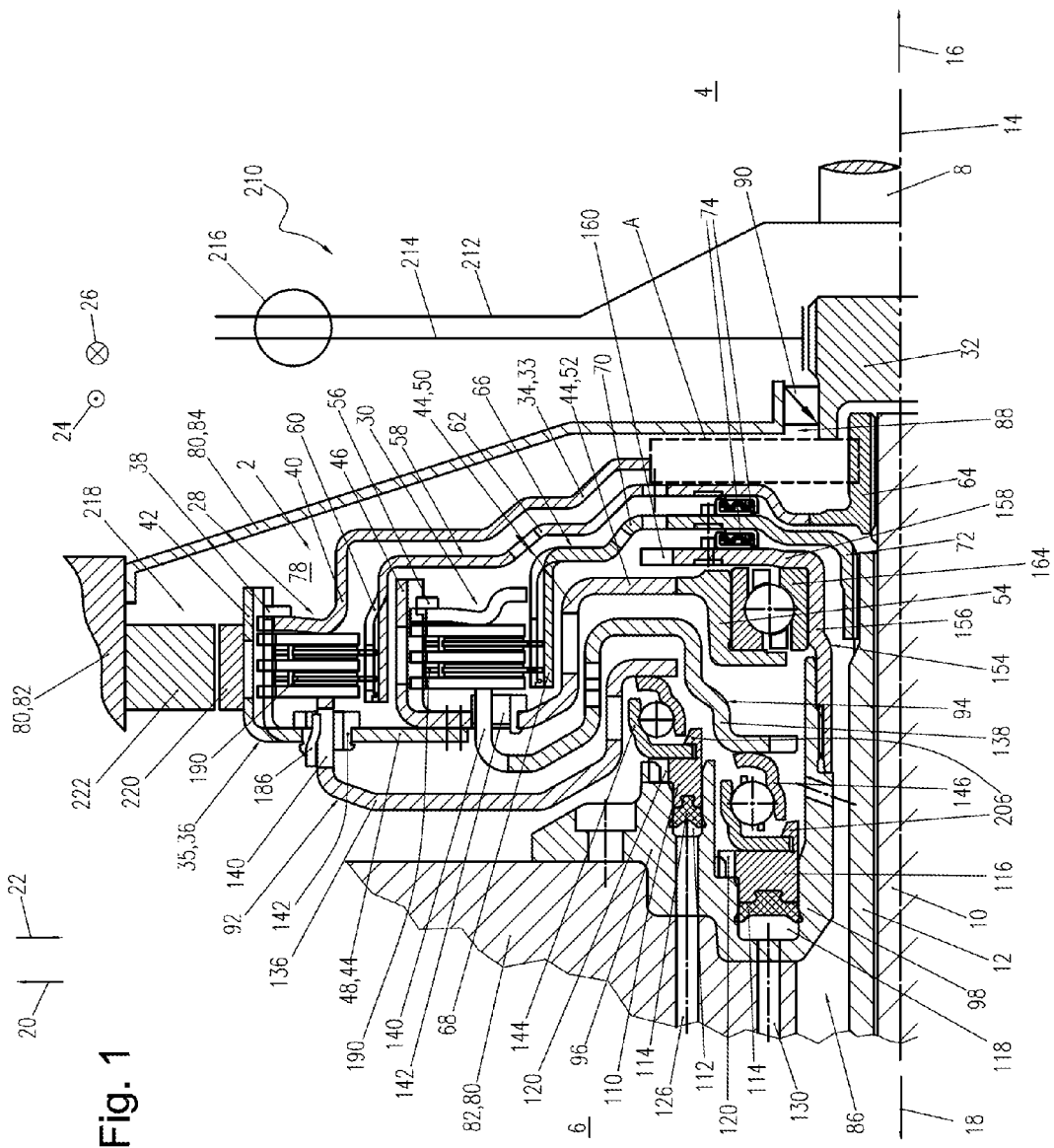

(51) Int. Cl.
  *F16D 13/52*  (2006.01)
  *B60K 6/48*  (2007.10)
  *F16D 23/14*  (2006.01)
  *F16D 41/04*  (2006.01)
  *F16D 41/00*  (2006.01)
  *F16D 21/06*  (2006.01)

(52) U.S. Cl.
  CPC ...... *F16D 41/04* (2013.01); *B60K 2006/4825* (2013.01); *F16D 41/00* (2013.01); *F16D 2021/0661* (2013.01); *Y02T 10/6221* (2013.01); *Y02T 10/6252* (2013.01)

(56) References Cited

U.S. PATENT DOCUMENTS

| | | | |
|---|---|---|---|
| 5,234,087 A | | 8/1993 | Jüergens et al. |
| 6,095,941 A | * | 8/2000 | Martin ............... F16H 3/66 |
| | | | 192/45.008 |
| 2010/0314185 A1 | * | 12/2010 | Schoenek ............ B60K 6/36 |
| | | | 180/65.7 |
| 2010/0317476 A1 | * | 12/2010 | Schoenek ............ B60K 6/26 |
| | | | 475/5 |
| 2011/0174103 A1 | * | 7/2011 | Kirchner ............ F16D 21/06 |
| | | | 74/325 |
| 2012/0178568 A1 | * | 7/2012 | Schoenek ............ B60K 6/48 |
| | | | 475/5 |
| 2013/0116079 A1 | * | 5/2013 | Wahl ................. F16H 1/36 |
| | | | 475/5 |
| 2014/0128218 A1 | * | 5/2014 | Ruder ............... B60K 6/383 |
| | | | 477/5 |

\* cited by examiner

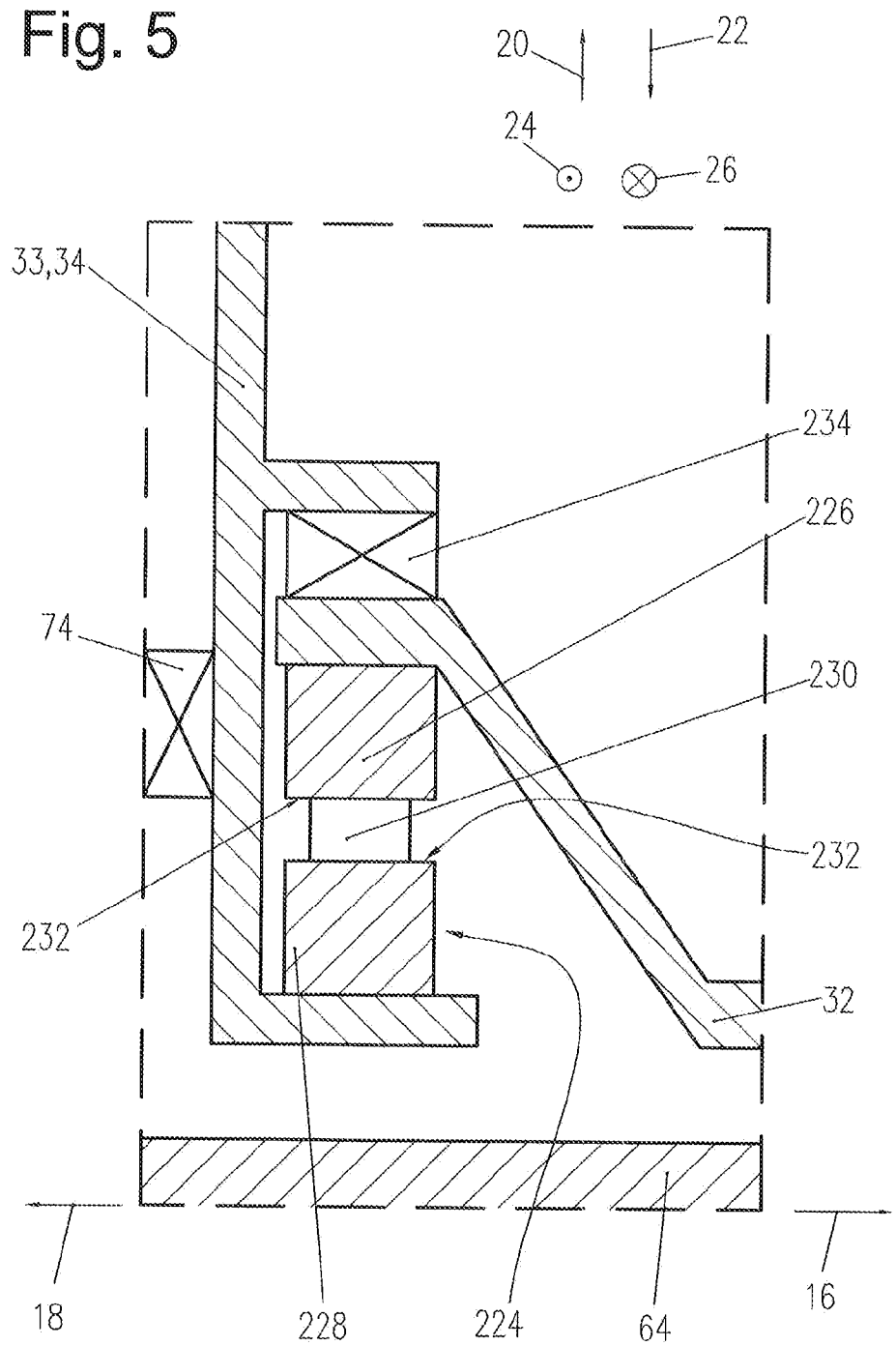

CLUTCH DEVICE FOR A DRIVE TRAIN

This application claims the benefit of PCT Application Serial No. 2013/33420 filed Mar. 22, 2013, and German Patent Application Serial No. DE 10 2012006730.5 filed Apr. 2, 2012.

The present invention concerns a clutch device for arrangement in a drive train of a motor vehicle between a drive unit and a gearbox, which comprises a clutch for optional torque transmission between the drive unit and the gearbox, a clutch input side to which a torque from the drive unit can be transmitted, and an electric machine allocated to the clutch input side.

In practice drive trains are known for motor vehicles in which a drive unit transmits a torque to a gearbox on a torque transmission path via a clutch device. To start the drive unit an electrically operated starter is provided. The starter has a drivable pinion which is provided in a toothing on the output shaft of the drive unit or on a flywheel. The toothing is not however connected rotationally fixed with the output shaft or flywheel in both directions of rotation, rather an overrun is provided between the output shaft or the flywheel firstly and the toothing secondly, which overrun transmits the torque applied by the starter from the toothing to the output shaft or flywheel only in one rotational direction. There is no transmission of the torque of the drive unit via the overrun to the toothing and hence to the pinion of the starter. Furthermore to start the drive unit, the starter can be electrically powered wherein after the drive unit has been started, the drive is completely taken over by the drive unit which transmits its torque to the gearbox via the torque transmission path previously described but—thanks to the overrun—no longer to the toothing or pinion of the starter, which thus does not constitute an obstacle for the drive unit and can be disengaged after the start process.

Furthermore drive trains for motor vehicles or hybrid vehicles are known in practice which have a drive unit, wherein the torque of the drive unit can be transmitted to a gearbox on a torque transmission path via a clutch device. The known clutch devices here have at least one clutch for optional torque transmission between the drive unit and the gearbox. In addition an electric machine is provided which can be used optionally as a generator or an electric drive. To be able to engage the electric machine optionally, the clutch device, in addition to the at least one clutch arranged within the torque transmission path, has an additional clutch which is formed as a multi-plate clutch. This additional clutch serves for optional torque transmission between the electric machine and the clutch input side so that the additional clutch-like the overrun for a starter previously described—is not arranged within the torque transmission path between the drive unit on one side and the clutch device or gearbox on the other.

The additional clutches described above for optional connection have proved successful but entail some disadvantages. Thus clutch devices with such an additional clutch for optional engagement of an electric machine can be associated with increased constructional complexity, which in particular leads to increased space requirement and higher weight of the clutch device. Secondly a relatively complex control system is required to engage or disengage the electric machine.

It is therefore an object of the present invention to provide a clutch device with an electric machine allocated to the clutch input side, which has a space- and weight-saving construction, and simplifies the engagement and disengagement of the electric machine.

This object is achieved by the features given in claim 1. Advantageous embodiments of the invention are the subject of the subclaims.

The clutch device according to the invention is intended for arrangement in a drive train of a motor vehicle between a drive unit, preferably a combustion engine, and a gearbox. The clutch device comprises a clutch for optional torque transmission between the drive unit and the gearbox. Although here only one clutch is mentioned, nonetheless two or more clutches can be provided so that the clutch device can also be a multiple clutch device, in particular a double clutch device. The clutch is preferably formed as a multi-plate clutch, wherein the clutch is formed particularly preferably as a wet-running multi-plate clutch in which the plates run in a coolant and/or lubricant such as for example oil. In addition the clutch is preferably a hydraulically activatable clutch. The clutch device furthermore has a clutch input side to which a torque from the drive unit can be transmitted, wherein preferably a common clutch input side is provided insofar as two or more clutches are provided in the clutch device. The clutch device furthermore has an electric machine allocated to the clutch input side. The electric machine can preferably be operated optionally as a generator or as a drive. According to the invention an overrun to transmit torque from the drive unit in only one rotational direction is arranged upstream of the clutch input side in relation to the torque transmission path. Thus the overrun is arranged within the torque transmission path between the drive unit and the clutch input side and thus does not constitute merely a branch from the torque transmission path between the drive unit and the clutch input side.

Since an overrun to transmit the torque from the drive unit in only one rotational direction is arranged in the torque transmission path between the drive unit and the clutch input side, a complex additional clutch in the form of a multi-plate clutch or similar can be omitted so that a clutch device is created which saves weight and construction space and in which the engagement and disengagement of the electric machine is greatly simplified. If the drive unit is disengaged, the electric machine can be operated as a drive in order, instead of the drive unit, to apply a torque on the clutch input side of the clutch device, while the overrun decouples this torque or rotational movement of the clutch input side from the drive unit. This can for example take place in purely electric drive mode, but it is also possible for the electric machine to support the drive unit, in particular at high loads. It is also possible to operate the electric machine in drive mode in order to allow an initial electric operation of the motor vehicle up to a predetermined speed, above which the drive is however partly or completely taken over by the drive unit. In addition the electric machine can at least partly replace any existing mechanical brake of the motor vehicle in order to recover the braking energy used. When the electric machine is in generator mode, it can charge the vehicle battery, in particular when the drive unit is only under low load.

In a preferred embodiment of the clutch device according to the invention, the overrun has an input side thrust ring which can be driven by the drive unit, and an output side thrust ring which is in torque-transfer connection with the clutch input side, and clamping elements are arranged between the thrust rings. In principle the output side thrust ring can be connected or be in torque-transfer connection directly with the clutch input side, in order however to allow a relatively compact overrun device even in clutch devices in which the clutch input side is arranged relatively widely outwardly offset in the radial direction, in this embodiment it is preferred if the output side thrust ring is in torque-transfer connection with a torque transmission element which is in torque-transfer connection with the clutch input side. Said torque transmission element is here preferably formed by a carrier plate which for example can be connected inwardly in the radial direction with the output side thrust ring and outwardly in the radial direction with a plate carrier forming the clutch input side, in which the carrier plate for example engages rotationally fixed by means of a toothing.

To achieve a particularly compact construction and ensure a secure transmission of torque from the drive unit via the overrun in one rotational direction, the output side thrust ring is formed of one piece with the clutch input side or the torque transmission element. In this way the output side thrust ring can be produced during production of the clutch input side or torque transmission element without having to produce an additional, separate, output side thrust ring and connect this with the clutch input side or torque transmission element. Thus not only a compact and secure construction is achieved but also simplified production. Alternatively the output side thrust ring is initially formed separately in order then to be connected rotationally fixed with the clutch input side or torque transmission element. Here it is preferred if the output side thrust ring is connected by material fit with the clutch input side or the torque transmission element, wherein the material fit connection in principle can be achieved by any method for creating a material fit connection. In this context it is however preferred if the output side thrust ring is welded with the clutch input side or torque transmission element.

In a further preferred embodiment of the clutch device according to the invention, a clutch input hub is provided which is in torque-transfer connection with the input side thrust ring. In this embodiment it is preferred if the input side thrust ring is formed of one piece with the clutch input hub in order to simplify further the production of the clutch device, in particular since the input side thrust ring can here be produced simply during production of the clutch input hub. In addition the one-piece construction of clutch input hub and input side thrust ring allows a particularly compact, space-saving and lightweight construction. Alternatively the input side thrust ring, initially as a separate part, can also be connected with the clutch input hub preferably by material fit, wherein in this case too any method for a preferably material fit, rotationally fixed connection can be considered. However for the material fit connection between the clutch input hub and input side thrust ring, it is preferred if the input side thrust ring is welded to the clutch input hub.

In principle the two thrust rings of the overrun can be arranged arbitrarily relative to each other as long as these have corresponding, mutually facing running surfaces for the intermediate clamping element. In order however to achieve a particularly secure arrangement of the thrust rings relative to each other and a particularly compact clutch device in the axial direction utilizing the existing construction space, the thrust rings are arranged radially nested in a particularly preferred embodiment of the clutch device according to the invention. In this embodiment the output side thrust ring can also form either an outer thrust ring or an inner thrust ring.

In principle the clamping elements of the overrun can be formed as catches or engaging hooks. However in the transmission of torque from the drive unit it has proved advantageous if the clamping elements are formed as clamping rollers, as is the case in an advantageous embodiment of the clutch device according to the invention, wherein the clamping rollers can roll on corresponding, mutually facing running surfaces of the thrust rings under the relative rotation between the two thrust rings. Here the clamping rollers need not necessarily have a circular periphery. However in this embodiment it is particularly preferred if the clamping rollers have such a circular periphery in order to ensure easy rolling of the clamping rollers on the mutually facing running surfaces of the thrust rings and reliable decoupling of the electric machine when this is driven for example as a drive while the drive unit is disengaged. Furthermore an overrun with clamping rollers with a circular periphery has proved less susceptible to fault.

In a further advantageous embodiment of the clutch device according to the invention, the torque transmission element, i.e. for example the abovementioned carrier plate, is or can be supported via a radial bearing on a clutch output hub or the clutch input hub. The radial bearing is preferably a roller bearing. By means of this support of the torque transmission element, any vibrations thereof in the radial direction which could result from the drive unit can be supported or suppressed relatively reliably so that corresponding relative vibrations between the two thrust rings of the overrun in the radial direction can be suppressed, relieving the load on the overrun or its thrust rings and clamping elements. Furthermore with this measure an extended life and reliable function of the overrun arranged in the torque transmission path between the drive unit and clutch input side is guaranteed. To reinforce this advantage further, the radial bearing in this embodiment is particularly preferably arranged radially nested with the overrun. This leads not only to a greater load relief on the overrun with regard to relative movements between the two thrust rings in the radial direction, but also to a particularly short axial construction length of the clutch device in the region of the overrun or radial bearing.

In a particularly advantageous embodiment of the clutch device according to the invention, furthermore a torsion vibration damper is provided which is arranged upstream of the clutch input side in relation to the torque transmission path between the drive unit and the clutch input side, in order to be able to damp any torque fluctuations in the torque of the drive unit. In this embodiment it has proved advantageous if the torsion vibration damper is arranged upstream of the overrun in relation to the torque transmission path. In this way torque pulses from the drive unit can be damped or even eliminated completely before the corresponding torque reaches the overrun. Thus consequently the load on the overrun, i.e. the load on the clamping elements and the two thrust rings, is significantly reduced so that the life of the overrun is extended despite its arrangement within the torque transmission path between the drive unit and the clutch input side. Also because of the reduced load, a smaller dimensioned overrun can be used. If the torsion vibration damper is arranged upstream of the overrun in the torque transmission path, it is furthermore preferred if the torsion vibration damper is in torque-transfer connection with the input side thrust ring via a damper output side, where applicable via the clutch input hub. Alternatively to this embodiment the torsion vibration damper can however also be arranged downstream of the overrun in relation to the torque transmission path and hence between the overrun on one side and the clutch input side on the other. In this case it is preferred if the torsion vibration damper forms the said torque transmission element. If the torque transmission element is formed by the torsion vibration damper between the output side thrust ring and the clutch input side, it has furthermore proved advantageous if a damper output side of the torsion vibration damper is or can be supported via the radial bearing on the clutch output hub or the clutch input hub. Alternatively however the damper input side, which is in torque-transfer connection with the output side thrust ring, is or can be supported via the radial bearing on the clutch output hub or clutch input hub. Both variants offer the abovementioned load relief of the overrun.

In order to keep the wear on the overrun low and hence guarantee its reliable function despite its arrangement within the torque transmission path between the drive unit and the clutch input side, in a further preferred embodiment of the clutch device according to the invention the clutch is arranged in a wet chamber in which the overrun is arranged. In other words a common wet chamber exists for the at least one clutch and the overrun. In this embodiment it is furthermore preferred if the torsion vibration damper is also arranged inside this common wet chamber.

In a further advantageous embodiment of the clutch device according to the invention, the electric machine has a rotor in torque-transfer connection with the clutch input side, and a stator. Here it is preferred if at least the rotor is also arranged inside the abovementioned wet chamber in order to achieve a short transmission path between the clutch input side and the rotor, and hence a particularly compact construction of the clutch device.

According to a further advantageous embodiment of the clutch device according to the invention, the abovementioned clutch input side is formed by a plate carrier, where applicable an outer plate carrier. In this embodiment in which the clutch is also formed as a multi-plate clutch, the rotor is preferably connected rotationally fixed with a plate carrier segment of the plate carrier. Alternatively or additionally the rotor is arranged radially nested with the at least one clutch in order to guarantee a short axial construction length of the clutch device.

In a further preferred embodiment of the clutch device according to the invention, the clutch device is a double clutch device. Thus it is preferred if the clutch is allocated to a first gearbox input shaft of the gearbox while furthermore a second clutch, which is also formed as a multi-plate clutch or wet-running multi-plate clutch, is provided for optional torque transmission between the drive unit and a second gearbox input shaft of the gearbox. In principle the double clutch device can be a parallel clutch device in which the two clutches are arranged axially stepped, or a concentric clutch device in which the clutches are arranged radially nested. The latter variant is preferred in the present embodiment, especially since this allows a particularly short axial construction length to be achieved. With a parallel double clutch device the rotor is arranged radially nested with at least one of the two clutches, whereas with a concentric double clutch device it is advantageous if the rotor is arranged radially nested both with the clutch and with the second clutch of the double clutch device.

Figure 2:
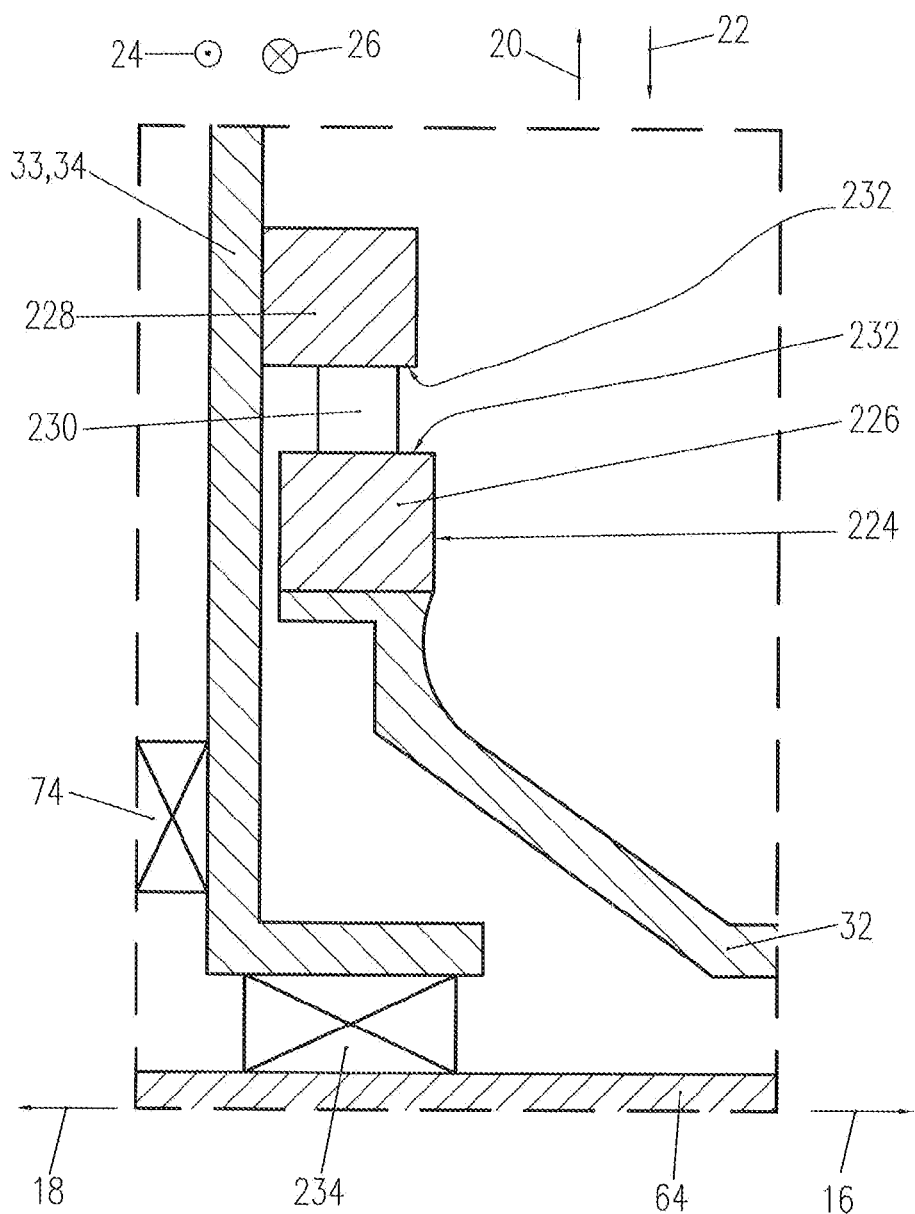
Figure 3:
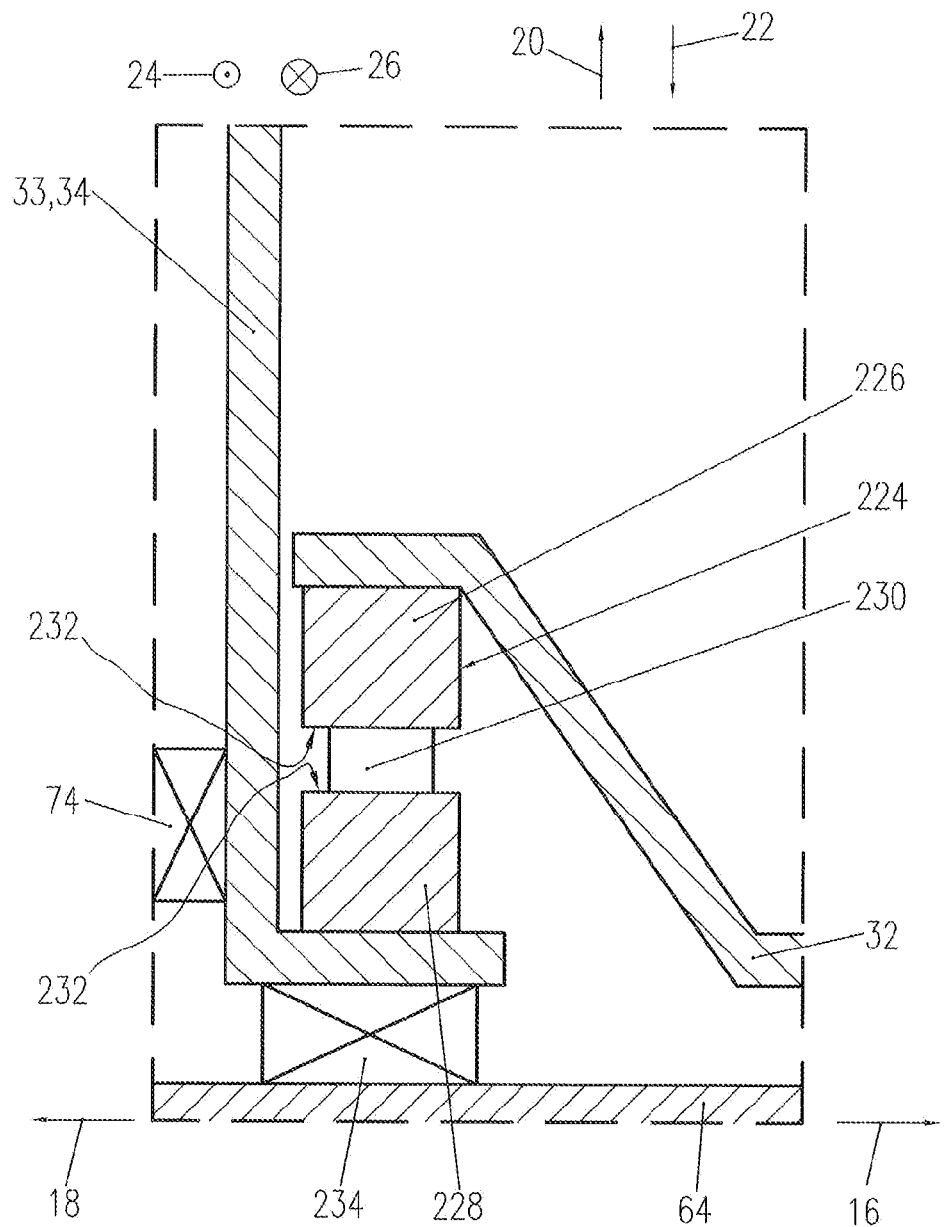
Figure 4:
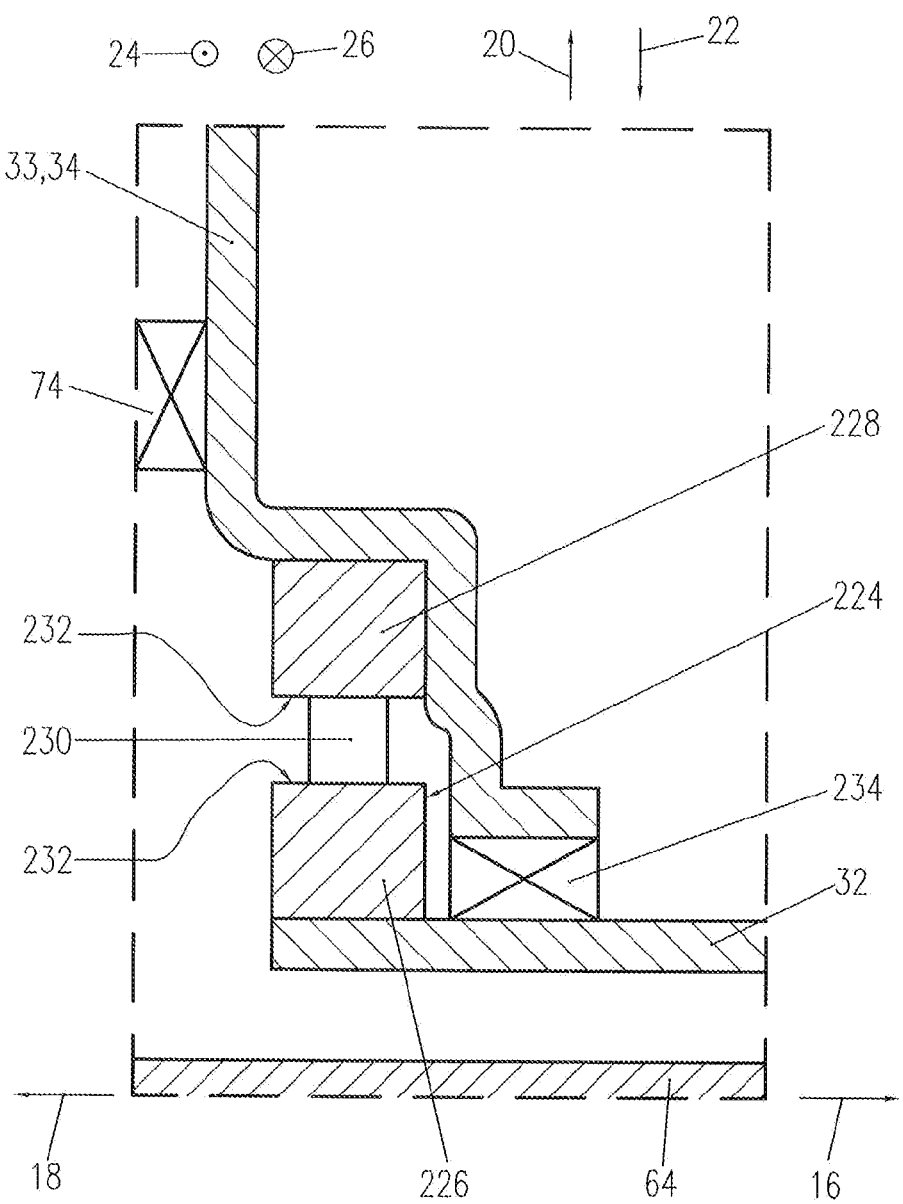

The invention is described in more detail in relation to an example embodiment with reference to the enclosed drawings. These show:

FIG. 1 a partial side view of an embodiment of the clutch device according to the invention in section view;

FIG. 2 the extract A from FIG. 1 in enlarged depiction in a first embodiment variant;

FIG. 3 the extract A from FIG. 1 in an enlarged depiction in a second embodiment variant;

FIG. 4 the extract A from FIG. 1 in an enlarged depiction in a third embodiment variant; and FIG. 5 the extract A from FIG. 1 in an enlarged depiction in a fourth embodiment variant.

FIG. 1 shows an embodiment of the clutch device 2 according to the invention, which is here formed as a concentric double clutch device, within a drive train of a motor vehicle between a drive unit 4 and a gearbox 6. Of the drive unit 4, which here is preferably a combustion engine, only the output hub 8 is shown. Of the gearbox 6, which here is preferably a double clutch gearbox, in the figure only a first gearbox input shaft 10 and a second gearbox input shaft 12 are shown. The clutch device 2 is rotatable about a rotary axis 14 which extends in mutually opposing axial directions 16, 18, wherein in FIG. 1 furthermore the mutually opposing radial directions 20, 22 and the mutually opposing rotational directions 24, 26 are indicated with corresponding arrows, wherein the rotational directions 24, 26 can also be considered circumferential directions.

The two gearbox input shafts 10, 12 extend along the rotary axis 14 in axial directions 16, 18, wherein the second gearbox input shaft 12 is formed as a hollow shaft through which the first gearbox input shaft 10 extends coaxially. The two gearbox inputs shafts 10, 12 are thus arranged nested in the radial direction 20, 22 so that the first gearbox input shaft 10 can be designated the inner gearbox input shaft and the second gearbox input shaft 12 the outer gearbox input shaft. The inner first gearbox input shaft 10 can be formed as a solid shaft, it is however also possible and where applicable desirable if the first gearbox input shaft 10 is also formed as a hollow shaft.

The clutch device 2 has a first clutch 28 allocated to the first gearbox input shaft 10 and a second clutch 30 allocated to the second gearbox input shaft 12. As the clutch device 2 is a concentric double clutch device, the two clutches 28, 30 are arranged nested in the radial direction 20, 22. Thus the first clutch 28 can also be called the outer clutch while the second clutch 30 can also be called the inner clutch. The two clutches 28, 30 are wet-running multi-plate clutches, so that the clutches 28, 30 are each substantially composed of a plate package of inner and outer plates. The first clutch 28 serves for optional torque transmission between the drive unit 4 and the first gearbox input shaft 10 of the gearbox 6, while the second clutch 30 serves for optional torque transmission between the drive unit 4 and the second gearbox input shaft 12 of the gearbox 6.

The clutch device 2 furthermore has a radially inner clutch input hub 32 which is in torque-transfer connection with the output hub 8 of the drive unit 4, wherein this torque-transfer connection is preferably formed by releasable form fit and is achieved via a torsion vibration damper described in more detail below. The clutch input hub 32 is formed closed in the axial direction 16 i.e. it has no continuous opening in the axial direction 16. The clutch input hub 32 in extract A is in torque-transfer connection with a torque transmission element 33, which in the embodiment shown is formed as a carrier plate 34 which extends substantially outward in the radial direction 20 from a region of the clutch input hub 32. On the outside in the radial direction 20, the torque transmission element 33 is connected rotationally fixed with the clutch input side 35 in the form of an outer plate carrier 36. This is a form-fit torque-transfer connection, wherein the torque transmission element 33 is or can be supported on the clutch input side 35 in the axial direction 16 via a securing ring 38. In addition the carrier plate 34 is curved in its radially outer region such that this also forms a stop 40 protruding in the axial direction 18, on which the first clutch 28 can be supported in the axial direction 16.

The outer plate carrier 36 is substantially composed of a first plate carrier segment 32 which is formed tubular and is in torque-transfer connection with the carrier plate 34 so that the first plate carrier segment 42 consequently forms the clutch input side 35, a supporting segment 44 which extends substantially inward in the radial direction 22 starting from the end of the first plate carrier segment 42 pointing in axial direction 18 and is formed of one piece with the first plate carrier segment 42, and a second plate carrier segment 46, wherein the latter is connected rotationally fixed with the supporting segment 44, is formed tubular and in the radial direction 22 is arranged inside the first plate carrier segment 42 and radially nested therewith. The supporting segment 44 is here divided into a first radial segment 48 which extends inward in the radial direction 22 starting from the first plate carrier segment 42 and on the side of which pointing in the radial direction 16 is arranged the second plate carrier segment 46, a tubular segment 50 adjacent to the first radial segment 48 which extends in the axial direction 16 starting from the end of the first radial segment 48 pointing inward in the radial direction 22 and thus is arranged radially nested in relation to the clutches 28, 30, and a second radial segment 52 adjacent to the end of the tubular segment 50 pointing in the axial direction 16, which again extends inward in the radial direction 22 starting from the tubular segment 50 in order there to hold a support hub 54, which achieves a direct support of the clutch device 2 on the clutch housing described in more detail below, wherein the support will be discussed in more detail below. On the second plate carrier segment 46 of the outer plate carrier 36 is furthermore provided a further securing ring 56, via which the second clutch 30 can be supported on the second plate carrier segment 46 in the axial direction 16.

Furthermore allocated to the first clutch 28 is an inner plate carrier 58 which substantially comprises a tubular plate carrier segment 60 and a supporting segment 62 adjacent to the tubular plate carrier segment 60 in the axial direction 16, wherein the supporting segment 62 extends inward in the radial direction 22 in order there, via the first clutch output hub 64, to stand in torque-transfer connection with the first gearbox input shaft 10. Allocated to the second clutch 30 again is a second inner plate carrier 66 which comprises a tubular plate carrier segment 68 and a supporting segment 70 adjacent to the plate carrier segment 68 in the axial direction 16, wherein the supporting segment 70 extends inward in the radial direction 22 in order there to stand in torque-transfer connection with the second gearbox input shaft 12 via a second clutch output hub 72. The outer plates of the clutches 28 or 30 are connected rotationally fixed but axially mobile with the first or second plate carrier segment 42, 46 respectively of the outer plate carrier 36, while the inner plates of the clutches 28 or 30 respectively are connected rotationally fixed but axially mobile with the plate carrier segment 60 or 68 respectively of the inner plate carrier 58 or 66.

As furthermore evident from FIGS. 1 to 5, in the axial direction 16, 18 between the torque transmission element 33 and supporting segment 62, between supporting segment 62 and supporting segment 70, and between supporting segment 70 and the flange segment of a carrier tube described in more detail below, is arranged in each case an axial bearing 74 in the form of a needle bearing in order to support said components on each other in the axial direction 16, 18 or separate them from each other. Here said axial bearings 74 are arranged preferably mutually aligned in the axial direction 16, 18. In addition the clutch input hub 32 can be supported in the radial direction 22 via a radial bearing (not shown) on the side of the first clutch output hub 64 pointing outward in the radial direction 20, wherein the first clutch output hub 64 to this end can extend in the axial direction 16 into the pot-like recess in the clutch input hub 32. Via such a radial bearing and the first clutch output hub 64, firstly a direct support of the input hub 32 can be achieved on the first gearbox input shaft 10 in the radial direction 22.

The clutch device 2 is arranged in a wet chamber 78 which is surrounded by a stationary and rotationally fixed clutch housing 80. Here the clutch housing 80 has a first housing segment 82 which delimits the wet chamber 78 in the axial direction 18 and in the radial direction 20, and in the present example is formed as a gearbox bellhousing with a housing opening pointing in the axial direction 16, and a second housing segment 84 which is formed as a housing cover which closes the housing opening of the first housing segment 82 and hence delimits the wet chamber 78 in the axial direction 16. In the region of the rotary axis 14, the first housing segment 82 has a central shaft passage opening 86 through which the gearbox input shafts 10, 12 of the gearbox 6 extend in the axial direction 16 to the clutch device 2 in the wet chamber 78. The second housing segment 84 also has a central shaft passage opening 88 through which the clutch input hub 32 extends in the axial direction 16 to the drive unit 4 and out of the wet chamber 78, wherein a seal 90 is provided between the input side of the shaft passage opening 88 in the second housing segment 84 and the side of the clutch input hub 32 pointing radially outward, in order to seal the wet chamber 78 in the axial direction 16.

Allocated to the first clutch 28 is a first actuator assembly 92, while allocated to the second clutch 30 is a second actuator assembly 94 which will be explained in more detail below. Thus a first pressure chamber housing 96 and a second pressure housing chamber 98 of the first or second actuator assembly 92, 94 can be mounted stationary and rotationally fixed on the housing segment 82 of the clutch housing 80. Thus the two pressure chamber housings 96, 98 are arranged or provided on the same housing segment 82 of the clutch housing 80. The pressure chamber housings 96, 98 are here attached releasably to the first housing segment 82. In the embodiment shown the first pressure chamber housing 96 and the second pressure chamber housing 98 are formed of one piece with each other. The two pressure chamber housings 96, 98 are formed annular so that these completely surround the rotary axis 14 in the peripheral direction 24, 26. In the first outer pressure chamber housing 96 is provided a circumferential recess which is open in the axial direction 16 and in which is inserted a hydraulically drivable first actuating piston 110, producing a first pressure chamber 112. The first pressure chamber 112 is thus delimited exclusively by the first pressure chamber housing 96 and the first actuating piston 110. The first pressure chamber 112 is formed annular, wherein furthermore a circumferential seal 114 is provided between the first actuating piston 110 and the wall of the first pressure chamber 112. A hydraulically drivable second actuating piston 116 is inserted in a circumferential recess, also open in the axial direction 16 inside the second pressure chamber housing 98, such that a second pressure chamber 118 is produced which is delimited exclusively by the second pressure chamber housing 98 and the second actuating piston 116, wherein in this case too a circumferential seal 114 is provided on the hydraulically drivable second actuating piston 116 to securely seal the second pressure chamber 118.

The two actuating pistons 110, 116 are arranged moveable in the axial direction 16, 18 within the associated pressure chamber housing 96 or 98, but the actuating pistons 110, 116 are each connected rotationally fixed with the associated pressure chamber housing 96, 98. Thus the actuating pistons 110, 116 can also be regarded as rotationally fixed actuating pistons which cannot rotate about the rotary axis 14 in the circumferential direction 24, 26. The rotationally fixed connection of the actuating pistons 110, 116 with the associated pressure chamber housing 96 or 98 is here preferably achieved by form fit, wherein this can be achieved for example by the protrusions 120 indicated in FIG. 1 on the actuating pistons 110, 116.

To be able to supply the first pressure chamber 112 with pressurized oil or another hydraulic medium, at least one first pressurized oil channel 126 is provided within the wall of the first housing segment 82 of the clutch housing 80. The first pressure chamber housing 96 is here attached to the first housing segment 82 such that the first pressurized oil channel 126 opens into an opening in the stationary and rotationally fixed first pressure chamber housing 96, and the first pressure chamber 112 can be supplied with pressurized oil via the first pressurized oil channel 126 and the opening. In addition, inside the wall of the first housing segment 82 of the clutch housing 80 is formed at least one second pressurized oil channel 130 which opens into the second pressure chamber 118 via an opening in the second pressurized chamber housing 98 so that the second pressure chamber 118 can be filled with pressurized oil.

The two clutches 28, 30 cannot be actuated directly by the associated actuating pistons 110 or 116. Rather a first force transmission element 136 and a second force transmission element 138 are provided. The two force transmission elements 136 and 138 are formed such that these bridge the gap between the actuating pistons 110 or 116 and the associated clutch 28 or 30 in the radial direction 22 or 20. This is necessary insofar as both the actuating pistons 110, 116 and the associated engagement bearing—which will be described in more detail below—are arranged radially further inward in relation to the clutch 28, 30. In this way the existing construction space can be utilized to the optimum and an increase in the axial construction length of the clutch device 2 can be avoided.

The force transmission elements 136, 138 extend substantially outward in the radial direction 20 starting from the actuating piston 110, 116 in order then, via actuating fingers 140 located at the end and extending in the axial direction 16, to reach to the associated clutch 28 or 30. The actuating fingers 140 here extend in the axial direction 16 through corresponding recesses 142 in the first radial segment 48 of the outer plate carrier 36, so that also a torque-transfer connection is achieved between the force transmission elements 136, 138 and the outer plate carrier 36. Both force transmission elements 136, 138 have a central recess through which inter alia the gearbox input shafts 10, 12 can extend.

To prevent a torque—where applicable merely due to friction—being transmitted from the force transmission element 136, 138 to the associated actuating piston 110 or 116, the actuating pistons 110, 116 and the associated force transmission elements 136 and 138 are decoupled for torque-transfer purposes by means of the engagement bearing 114, 116 between the actuating piston 110, 116 and the force transmission element 136 or 138. Thanks to this torque-transfer decoupling, in principle the rotationally fixed arrangement of actuating piston 110, 116 on the associated pressure chamber housing 96 or 98 can be omitted, but the rotationally fixed arrangement of the actuating piston 110, 116 on the associated pressure chamber housing 96 or 98 is however preferred, in particular to be able to prevent particularly effectively a rotation of the actuating piston 110, 116 in the circumferential direction 24, 26 relative to the associated pressure chamber housing 96 or 98, so that a particularly good seal can be achieved of the respective chamber 112, 118 in the region of the circumferential seals 114.

Thanks to the stationary and rotationally fixed pressure chamber housing 96, 98 and the rotationally fixed actuating pistons 110, 116 which moreover are decoupled for torque transfer purposes from the associated force transmission element 136, 138, the pressure chambers 112, 118 can be subjected to pressurized oil under particularly high pressure, in particular the clutch device 2 according to the invention has no rotational passage, the rotational passage seals of which would only be able within limits to resist a high pressure of the pressurized oil. For this reason, in the clutch device 2 shown, furthermore at least one high pressure accumulator is integrated in the pressurized oil supply path, wherein said high pressure accumulator is not shown in the figure. In addition the stationary and rotationally fixed pressure chamber housings 96, 98 and the rotationally fixed actuating pistons 110, 116 which are decoupled for torque transfer purposes do not cause centrifugal oil pressure to build up in the pressure chambers 112 and 118 so that the clutch device 2 requires no corresponding compensation chambers for centrifugal oil compensation, which would require a more complex structure of the clutch device 2.

Amongst others because of the higher pressure inside the pressurized oil supply paths, no lever-like formation of the force transmission elements 136, 138 is required although this would in principle also be possible here. Thus the force transmission elements 136, 138 are formed such that these transmit the forces acting in the actuation direction from the actuating pistons 110, 116 without lever translation in the ratio of 1:1 to the associated clutch 28 or 30. The actuation direction of both actuating pistons 110, 116 here corresponds to the axial direction 16. Since no lever-like force transmission element is required, a reduction in axial construction length of the clutch device 2 and a reduced structural complexity can be achieved. Also the force transmission elements 136, 138 are formed of one piece to simplify the structure. To further simplify the structure, the force transmission elements 136, 138 cooperate directly with the associated engagement bearings 144 or 146 and the associated clutch 28 or 30.

The outer plate carrier 36 of the clutch device 2 is or can be supported directly on the clutch housing 80 in the axial direction 16 and in the radial direction 22. In order to achieve such a support of the clutch device 2 and hence the actuating forces of the actuating pistons 110, 116, a stationary carrier tube 154 is provided which is attached and supported directly or indirectly—here indirectly—on the first housing segment 82 of the clutch housing 80. The carrier tube 154 is composed of one piece of a tubular segment 156 which extends in the axial direction 16, 18 and through which run the gearbox input shafts 10, 12, and a flange segment 158 which is adjacent to the tubular segment 156 in the axial direction 16 and which extends substantially outward in the radial direction 20. The flange segment 158 furthermore comprises a mounting segment 160 for releasable fixing of an insert tool (not shown), wherein the mounting segment 160 is formed on the end of the flange segment 158 pointing outward in the radial direction 20. The mounting segment 160 can for example be a segment with fixing recesses and/or protrusions which can be brought by form fit into torque-transfer connection with the said insert tool. The mounting segment 160 is here arranged aligned in the axial direction 16, 18 with mounting windows in the carrier plate 34, the supporting segment 62 of the first inner plate carrier 58 and the supporting segment 70 of the second inner plate carrier 66. The mounting windows are aligned with each other and with the mounting segment 160 such that the insert tool can be passed in the axial direction 18 through the mounting window on the mounting segment 160. In the axial direction 16, 18, between the supporting segment 70 of the second inner plate carrier 66 and the flange segment 158 of the carrier tube 154, is arranged the abovementioned axial bearing 74 in the form of a needle bearing which supports the supporting segment 70 on the flange segment 158 in the axial direction 18 or separates said components from each other in the axial direction 16, 18.

On its side facing away from the flange segment 158, the tubular segment 156 of the carrier tube 154 is attached releasably to the second pressure chamber housing 98. To this end, the tubular segment 156 has an external thread (not marked) which is screwed into an internal thread on the second pressure chamber housing 98.

In order to support the clutch device 2 on the clutch housing 80 in the axial direction 16 and in the radial direction 22, a roller bearing 164—which in the present example is formed as a ball bearing—is provided in the radial direction 20, 22 between the support hub 54 of the outer plate carrier 36 and the radially outward pointing side of the tubular segment 156 of the carrier tube 154. The support hub 54 is here formed such that this can be supported in the axial direction 16 on the outer ring of the roller bearing 164. The inner ring of the roller bearing 164 however is supported in the axial direction 16, preferably directly, on the side of the flange segment 158 of the carrier tube 154 facing the tubular segment 156. In addition the inner ring of the roller bearing 164 can be supported in the axial direction 18 on the second pressure chamber housing 98. By supporting the roller bearing 164 in the axial direction 18 on the second pressure chamber housing 98, there is no need for an additional securing ring on the tubular segment 156 of the carrier tube 154. Rather the second pressure chamber housing 98, present in any case, would be used to fix the roller bearing 164, wherein the inner ring of the roller bearing 164 is supported automatically on the second pressure chamber housing 98 in the axial direction 18 when the carrier tube 154 is screwed to the first pressure chamber housing 96, so that assembly is substantially simplified. Although not shown in the figure, it is furthermore pointed out that the roller bearing 164 can also be a roller bearing with split inner and/or outer ring in order to guarantee increased tilt security. Thus the roller bearing 164 can for example be a so-called four-point bearing, hence a deep groove ball bearing with in particular ground inner and outer rings, whereby the tilt security would be improved. It should however be noted that the mounting complexity would be greater in this case.

The actuating forces of the actuating pistons 110, 116 acting in the actuation direction or in the axial direction 16 can be supported particularly suitably via the clutch 28, 30, roller bearing 164, carrier tube 154 and the second pressure chamber housing 98, directly on the first housing segment 82 of the clutch housing 80. Although previously mention was always made of pressure chamber housings 96, 98, these pressure chamber housings 96, 98 can also be designated cylinders of the respective actuator assembly 92 or 94. It is furthermore clarified that the stationary and rotationally fixed pressure chamber housings 96, 98 are arranged on the slave side of the respective actuator assembly 92 or 94 so that the pressure chamber housings 96, 98 could also be called slave cylinders.

As previously stated, the clutches 28, 30 shown are wet-running multi-plate clutches which consequently have a flow of cooling oil or another cooling medium. To this end a cooling oil supply path is provided which initially runs through the shaft passage opening 86 and between the edge of the shaft passage opening 86 and the outside of the second gearbox input shaft 12. The cooling oil supply path then runs further in the axial direction 16 into the annular chamber between the second pressure chamber housing 98 and the tubular segment 156 firstly and the second gearbox input shaft 12 secondly. In the tubular segment 156 and/or the radially inner segment of the second pressure chamber housing 98, cooling oil openings are provided through which the cooling oil supply path can then extend outward in the radial direction 20. In the further course of the cooling oil supply path this extends through a cooling oil opening in the tubular segment 50 of the outer plate carrier 36. In this way the cooling oil supply path first reaches the second clutch 30 and then the first clutch 28, wherein corresponding further cooling oil openings are provided in the plate carrier segments 68, 46, 60 and 42, although not all these cooling oil openings are shown in the figure. In other words the cooling oil supply runs from the gearbox 6 or the gearbox side, while the wet chamber 78 is sealed to the drive unit 4 or drive unit side.

In the clutch device 2, the actuating fingers 140 of the first force transmission element 136 are or can be inserted by engagement in the recesses 142 in the radial segment 48 of the outer plate carrier 36. Thus the actuating fingers 140, in an insertion direction which here corresponds to the axial direction 16, are or can be inserted by engagement in the recesses 142 such that the force transmission element 136 is or can be supported in the direction opposite the insertion direction, i.e. here in axial direction 18, on the plate carrier 36 forming the input side of the double clutch device 2. To this end a locking element 186 is inserted in at least one of the recesses 142 and cooperates by engagement with the respective actuating finger 140. The locking element 186 is preferably formed as a plastic element.

Both actuating pistons 110, 116 are made of plastic and are connected by engagement with the respective engagement bearing 144, 146. To this end the actuating pistons have elastic locking elements 206 which are formed as one piece with the actuating pistons 110, 116. In the embodiment shown the locking elements 206 are formed as locking tongues, wherein the locking elements 206 engage behind the engagement bearing 144, 146 after locking, preferably from the inside in the axial direction 18.

The actuating pistons 110, 116 are reset via spring devices, wherein the spring devices are each formed by a multiplicity of spring elements 190 which are arranged between the outer plates of the clutches 28, 30 and in the embodiment shown are formed as undulating rings. The spring elements 190 thus serve for spacing or separation of the outer plates and hence for achieving the set air gap between the plates.

The clutch device 2 furthermore comprises a torsion vibration damper 210 which is indicated merely diagrammatically in FIG. 1, wherein the torsion vibration damper 210 has a damper input side 212 and a damper output side 214, between which spring elements 216 are arranged for rotationally elastic coupling of the damper input side 212 with the damper output side 214. The damper input side 212 is in torque-transfer connection with the output hub 8 of the drive unit 4, while the damper output side 214 is in torque-transfer connection—here via toothing—with the clutch input hub 32.

Furthermore the clutch device 2 has an electric machine 218 allocated to the clutch input side 35. The electric machine 218 can be operated both as a drive and as a generator. To this end the electric machine 218 has a rotor 220 in torque-transfer connection with the clutch input side 35, and a stator 222 surrounding the rotor 220 outwardly in the radial direction 20. In the embodiment shown, the rotor 220 is connected rotationally fixed with the plate carrier segment 42 of the outer plate carrier 36 or the clutch input side 35. At least the rotor 220—as evident from FIG. 1—is arranged inside the wet chamber 78, wherein in the embodiment shown the stator 222 is also arranged inside the wet chamber 78. Both the rotor 220 and the stator 222 are arranged radially nested with the two clutches 28, 30 of the clutch device 2. In other words, the rotor 220 and the stator 222 surround the clutches 28 and 30 from the outside in the radial direction 20.

As evident from FIGS. 2 to 5 which show different embodiment variants of segment A of FIG. 1, the clutch device 2 furthermore has an overrun 224. The overrun 224 here serves for transmission of the torque from the drive unit 4 to the clutch input side 35 in the form of the outer plate carrier 36 or plate carrier segment 42, wherein the overrun 224 is formed such that this transmits the torque from the drive unit 4 in only one of the two rotational directions 24, 26. In the present example it is assumed that this is the rotational direction 24, so that the overrun 224 transmits the torque from an output hub 8 of the drive unit 4 rotated in rotational direction 24. The overrun 224 is thus arranged in the torque transmission path between the drive unit 4 firstly and the clutch input side 35 secondly, so that the overrun 224 is arranged upstream of the clutch input side 35 in relation to said torque transmission path.

The overrun 224 has in each case an input side thrust ring 226 which can be driven by the drive unit 4, an output side thrust ring 228 which is directly or indirectly in torque-transfer connection with the clutch input side 35, and clamping elements 230 arranged between the thrust rings 226, 228. In principle any type of clamping element can be considered but it is preferred if the clamping elements 230 are formed as clamping rollers which particularly preferably have a circular periphery in order to be able to roll on the mutually facing running surfaces 232 of the thrust rings 226, 228.

The two thrust rings 226, 228 of the overrun 224 are arranged nested in the radial direction 20, 22. Here the output side thrust ring 228 is formed either as an external thrust ring, as is the case in FIGS. 2 and 4, or as an internal thrust ring, as is the case in FIGS. 3 and 5.

The output side thrust ring 228 is indirectly in torque-carrying connection with the clutch input side 35, namely via the torque transmission element 33 in the form of the carrier plate 34. To this end the output side thrust ring 228 can be formed by the torque transmission element 33 itself and thus be formed of one piece with the torque transmission element 33. Alternatively the initially separate output side thrust ring 228 can be connected rotationally fixed with the torque transmission element 33. In this case it is preferred if a material fit connection exists between the output side thrust ring 228 and the torque transmission element 33, wherein in such a case for example a weld connection is suitable and preferred between the output side thrust ring 228 and the torque transmission element 33.

The input side thrust ring 226 of the overrun 224 is however in torque-transfer connection with the abovementioned clutch input hub 32 or is connected rotationally fixed therewith. Here too it is preferred if the input side thrust ring 226 is formed by the clutch input hub 32 itself and thus formed of one piece with the clutch input hub 32. Alternatively however here too it is possible that the initially separate input side thrust ring 226 is connected rotationally fixed with the clutch input hub 32. Here it is preferred if a material fit connection exists between the input side thrust ring 226 and clutch input hub 32, wherein again in this case a weld connection is preferred. In each case the input side thrust ring 226 and hence the entire overrun 224 is arranged on the clutch input hub 32 such that the overrun 224 is also arranged in the wet chamber 78 of clutches 28, 30.

Irrespective of the type of torque transmission element 33 selected—in this case the carrier plate 34—the torque transmission element 33 is or can be supported inwardly in the radial direction 22 via a radial bearing 224, which is preferably a roller bearing, either on the first clutch output hub 64 as is the case in the embodiments in FIGS. 2 and 3, or on the clutch input hub 32, wherein the latter variant is shown in FIGS. 4 and 5. Irrespective of whether the torque transmission element 33 is or can be supported on the first clutch output hub 64 or the clutch input hub 32 via the radial bearing 234, the radial bearing 234 is preferably arranged radially nested with the overrun 224, as can be seen in FIGS. 2, 3 and 5. In FIG. 4 the overrun 224 and radial bearing 234 are indeed arranged stepped or behind each other in the axial direction 16, 18, but in the embodiment variant in FIG. 4 also a radial nesting would be possible. Under some circumstances however the axial stepping, as shown in FIG. 4, may be suitable, in particular as this can simplify the production of the torque transmission element 33 and/or clutch input hub 32.

The abovementioned torque transmission path between the drive unit 4 firstly and the clutch input side 35 secondly runs via the output hub 8, the torsion vibration damper 210, the clutch input hub 32, the overrun 224 and the torque transmission element 33. Furthermore in the embodiment shown the torsion vibration damper 210 is arranged upstream of the overrun 224 in relation to this torque transmission path, wherein the damper output side 214 is in torque-transfer connection with the input side thrust ring 226 via the clutch input hub 32. Although this is not shown in FIG. 1, the torsion vibration damper 210 can also be arranged inside the wet chamber 78 for the first and second clutch 28, 30. Irrespective of this the torsion vibration damper 210 arranged upstream of the overrun 224 in relation to the torque transmission path prevents strong rotational pulses from the drive unit 4 being transmitted to the overrun 224, so that the load on the overrun 224 is relieved. Thus in this embodiment a relatively compact overrun 224 can be used which nonetheless is suitable for securely transmitting the torque from the drive unit 4 to the clutch input side 35.

In a further embodiment (not shown) of the clutch device 2 of FIG. 1, in relation to the torque transmission path, the torsion vibration damper 210 is not arranged upstream of the overrun 224 but downstream thereof. In this case the torsion vibration damper 210, instead of the carrier plate 34, forms the torque transmission element 33, wherein the output side thrust ring 228 of the overrun 224 in this case would be connected rotationally fixed with the damper input side 212 while the damper output side 214 would be in torque-transfer connection with the clutch input side 35. In such an embodiment it is furthermore preferred if the damper output side 214 and/or the damper input side 212 of the torsion vibration damper 210 forming the torque transmission element 33 is or can be supported on the first clutch output hub 64 or the clutch input hub 32 via the abovementioned radial bearing 234. An arrangement has proved particularly advantageous here in which the damper output side 214 is or can be supported on the first clutch output hub 64 via the radial bearing 234. In this embodiment too it is preferred if the torsion vibration damper 210 is arranged inside the wet chamber 78 of the first and second clutch 28, 30.

LIST OF REFERENCE NUMERALS

2 Clutch device
4 Drive unit
6 Gearbox
8 Output hub
10 First gearbox input shaft
12 Second gearbox input shaft
14 Rotary axis
16 Axial direction
18 Axial direction
20 Radial direction
22 Radial direction
24 Circumferential direction
26 Circumferential direction
28 First clutch
30 Second clutch
32 Clutch input hub
33 Torque transmission element
34 Carrier plate
35 Clutch input side
36 Outer plate carrier
38 Securing ring
40 Stop
42 First plate carrier segment
44 Supporting segment
46 Second plate carrier segment
48 First radial segment
50 Tubular segment
52 Second radial segment
54 Support hub
56 Securing ring
58 First inner plate carrier
60 Plate carrier segment
62 Supporting segment
64 First clutch output hub
66 Second inner plate carrier
68 Plate carrier segment
70 Supporting segment
72 Second clutch output hub
74 Axial bearing
78 Wet chamber
80 Clutch housing
82 First housing segment
84 Second housing segment
86 Shaft passage opening
88 Shaft passage opening
90 Seal
92 First actuator assembly
94 Second actuator assembly
96 First pressure chamber housing
98 Second pressure chamber housing
108 Base leg
110 First actuating piston
112 First pressure chamber
114 Circumferential seals
116 Second actuating piston
118 Second pressure chamber
120 Protrusions
126 First pressurized oil channel
130 Second pressurized oil channel
132 Channel
134 Opening
136 First force transmission element
138 Second force transmission element
140 Actuation finger
142 Recesses
144 Engagement bearing
146 Engagement bearing
154 Carrier tube
156 Tubular segment
158 Flange segment
160 Mounting segment
164 Roller bearing
186 Locking element
190 Spring element
206 Locking elements
210 Torsion vibration damper
212 Damper input side
214 Damper output side
216 Spring elements
218 Electric machine
220 Rotor
222 Stator
224 Overrun
226 Input side thrust ring
228 Output side thrust ring
230 Clamping elements
232 Running surface
234 Radial bearing

The invention claimed is:

1. A clutch device for arrangement in a drive train of a motor vehicle between a drive unit and a gearbox that receives input from the clutch device through a gearbox input shaft, which comprises a clutch, a clutch input side to which a torque from the drive unit can be transmitted, a clutch output side that includes a plate carrier rotationally fixed with the gearbox input shaft through a supporting segment of the plate carrier, a clutch housing that houses the clutch, and an electric machine allocated to the clutch input side, wherein an overrun device to transmit the torque from the drive unit in only one rotational direction is arranged upstream of the clutch input side in relation to the torque transmission path, wherein the overrun device has an input side thrust ring which can be driven by the drive unit, an output side thrust ring which is in torque-transfer connection with the clutch input side, and clamping elements arranged between the thrust rings, wherein the output side thrust ring is in torque-transfer connection with the clutch input side through a torque transmission element, wherein the overrun device is disposed between, and is adjacent to each of, the clutch housing and the supporting segment of the plate carrier.

2. The clutch device as set forth in claim 1, wherein the output side thrust ring is formed of one piece with the clutch input side or the torque transmission element, or is connected by material fit, with the clutch input side or the torque transmission element, and wherein the clutch device comprises an outer clutch and an inner clutch nested radially inside the outer clutch, the outer clutch includes a first plate carrier segment, and the inner clutch includes a second plate carrier segment, and the torque transmission element is fixed to rotate with both the first plate carrier segment and the second plate carrier segment.

3. The clutch device as set forth in claim 1, wherein a clutch input hub is provided which is in torque-transfer connection with the input side thrust ring, the clutch input hub driven by the drive unit, wherein the input side thrust ring is formed of one piece with the clutch input hub or is connected by material fit, with the clutch input hub and wherein the torque transfer element is supported on the clutch input hub by a bearing.

4. The clutch device as set forth in claim 1, wherein the thrust rings are arranged radially nested, wherein the output side thrust ring forms either an outer thrust ring or an inner thrust ring, and/or the clamping elements are formed as clamping roller, and comprising an axial bearing through which the clutch device is rotationally supported against the supporting segment of plate carrier.

5. The clutch device as set forth in claim 1, wherein the torque transmission element is supported via a radial bearing, on a clutch output hub or the clutch input hub, and is supported via an axial bearing on the plate carrier.

6. The clutch device as set forth in claim 1, wherein a clutch input hub is provided which is in torque-transfer connection with the input side thrust ring, wherein the input side thrust ring is connected with the clutch input hub and the output side thrust ring is connected with the torque transmission element and wherein the torque transmission element include a first arm and a second arm spaced from the first arm wherein the output thrust ring is connected at the second arm and the torque transmission element is supported on the clutch input hub through the first arm.

7. The clutch device as set forth in claim 1, wherein the torque transmission element is supported via a radial bearing on a clutch output hub or the clutch input hub, and is supported via an axial bearing on a supporting segment of a plate carrier that is rotationally fixed to the clutch output hub.

8. A clutch device for arrangement in a drive train of a motor vehicle between a drive unit and a gearbox, the clutch device disposed in a clutch housing, the clutch device comprising a clutch, a clutch input side to which a torque from the drive unit can be transmitted through a torque transmission path that extends from the drive unit to the clutch, and a clutch input hub through which input from the drive unit is provided to the clutch device, the clutch input hub extending out of the clutch housing, and an electric machine connected at the clutch input side, wherein an overrun device to transmit the torque from the clutch input hub in only one rotational direction is arranged upstream of the clutch input side in the torque transmission path, wherein a torsion vibration damper is disposed outside the clutch housing and between the drive unit and the clutch input hub.

9. The clutch device as set forth in claim 8, wherein a seal is engaged against the clutch input hub and the clutch housing.

10. A clutch device for arrangement in a drive train of a motor vehicle between a drive unit and a gearbox, which comprises a clutch, a clutch input side to which a torque from the drive unit can be transmitted to the clutch, and an electric machine that has a rotor rotationally fixed to the clutch input side, wherein an overrun device to transmit the torque from the drive unit in only one rotational direction is arranged upstream of the clutch input side in relation to the torque transmission path from the drive unit to the clutch, wherein the clutch device comprises an outer clutch and an inner clutch nested radially inside the outer clutch, the outer clutch includes a first plate carrier carrying a first number of plates and a second plate carrier carrying a second number of plates that interleave with the first number of plates, and the inner clutch includes a third plate carrier carrying a third number of plates and a fourth plate carrier carrying a fourth number of plates that interleave with the third number of plates, and a torque transmission element that is fixed to rotate with both the first plate carrier and the third plate carrier.

11. The clutch device as set forth in claim 10, wherein a first outer plate carrier of the outer clutch is connected to a second outer plate carrier of the inner clutch through a supporting segment that has an opening, wherein a force transmission element extends through the opening for transmitting a force to actuate the outer clutch.

12. The clutch device as set forth in claim 10, comprising a clutch housing containing the clutch device, wherein a first supporting segment connects the first plate carrier with the third plate carrier and wherein a second supporting segment supports the first and third plate carriers on the clutch housing through a bearing.

13. The clutch device as set forth in claim 10, wherein the torque transmission element is supported via a radial bearing on a clutch output hub or a clutch input hub, wherein the radial bearing is arranged radially nested with the overrun device.

14. A clutch device for arrangement in a drive train of a motor vehicle between a drive unit and a gearbox, which comprises a first clutch that has a first outer plate carrier and a first inner plate carrier selectively engageable with the first outer plate carrier through a first number of clutch plates, and a second clutch that has a second outer plate carrier and a second inner plate carrier selectively engageable with the second outer plate carrier through a second number of clutch plates, the second clutch radially nested inside the first clutch, a clutch input side to which a torque from the drive unit can be transmitted in a torque transmission path to both the first and second clutches, wherein an overrun device to transmit the torque from the drive unit in only one rotational direction is arranged upstream of the clutch input side in relation to the torque transmission path from the drive unit to the clutch, wherein the overrun device has an input side thrust ring connected to the drive unit and an output side thrust ring connected with the clutch input side, wherein the electric machine has a rotor in torque-transfer connection with the clutch input side by being directly fixed on the first outer plate carrier so that the first clutch is radially nested inside the rotor, and a stator surrounding the rotor, and a torque transfer element extending from the output side thrust ring radially outward past the second clutch to the first outer plate carrier.

15. A clutch device for arrangement in a drive train of a motor vehicle between a drive unit and a gearbox, which comprises first and second clutches, a clutch input side to which a torque from the drive unit can be transmitted to the first and second clutches through a torque transmission path, and an electric machine connected to the clutch input side, wherein an overrun device to transmit the torque from the drive unit in only one rotational direction is arranged upstream of the clutch input side in relation to the torque transmission path from the drive unit to the first and second clutches, wherein the first clutch is allocated to a first gearbox input shaft of the gearbox, and the second clutch, is provided for optional torque transmission between the drive unit and a second gearbox input shaft of the gearbox wherein a first plate carrier of the first clutch is connected to a second plate carrier of the second clutch through a supporting segment of the clutch input side that has an opening, wherein a force transmission element extends through the opening for transmitting a force to actuate the first clutch.

\* \* \* \* \*